(12) United States Patent
Edwards

(10) Patent No.: US 6,178,875 B1
(45) Date of Patent: Jan. 30, 2001

(54) CARBON DIOXIDE PRECOOLING SYSTEM FOR A CARBONATOR

(75) Inventor: William A. Edwards, Lavernia, TX (US)

(73) Assignee: Lancer Partnership. Ltd., San Antonio, TX (US)

(*) Notice: Under 35 U.S.C. 154(b), the term of this patent shall be extended for 0 days.

(21) Appl. No.: 09/232,796

(22) Filed: Jan. 19, 1999

(51) Int. Cl.[7] .............................. A23L 2/26; F02M 15/00
(52) U.S. Cl. .................................... 99/323.2; 261/DIG. 7; 261/128; 261/152; 422/305; 62/70
(58) Field of Search ........................... 99/323.2, 323.1, 99/275; 261/DIG. 7, 127, 128, 152; 422/305, 239, 277, 278; 62/70, 48.2, 121

(56) References Cited

U.S. PATENT DOCUMENTS

| | | | |
|---|---|---|---|
| 4,416,194 | * | 11/1983 | Kemp ............................ 99/323.2 X |
| 5,192,513 | * | 3/1993 | Stumphauzer et al. ......... 99/323.1 X |
| 5,231,851 | * | 8/1993 | Adolfsson ................... 261/DIG. 7 X |
| 5,592,867 | * | 1/1997 | Walsh et al. ......................... 99/323.2 |
| 5,704,276 | * | 1/1998 | Osajima et al. ..................... 99/323.2 |

* cited by examiner

Primary Examiner—Reginald L. Alexander
(74) Attorney, Agent, or Firm—Christopher L. Makay

(57) ABSTRACT

A carbon dioxide precooling system, linked with a carbon dioxide source and with a carbonator, for aiding in carbonated water formation includes a carbon dioxide line linked with the carbon dioxide source at an inlet and with the carbonator at an outlet. As such, carbon dioxide travels from the carbon dioxide source, across the carbon dioxide line, and to the carbonator. The carbon dioxide precooling system includes a cooling device in cooperative engagement with the carbon dioxide line. The cooling device sufficiently cools the carbon dioxide within the carbon dioxide line prior to entering the carbonator thereby aiding in the formation of carbonated water within the carbonator.

14 Claims, 2 Drawing Sheets

100 # CARBON DIOXIDE PRECOOLING SYSTEM FOR A CARBONATOR

BACKGROUND OF THE INVENTION

1. Field of the Invention

The present invention generally relates to dispensing equipment and, more particularly, but not by way of limitation, to a carbon dioxide precooling system for a carbonator that cools carbon dioxide prior its introduction into a carbonator tank.

2. Description of the Related Art

Typically, beverage dispenser systems dispense a beverage flavor syrup mixed with either plain water to form a drink, such as punch, or carbonated water to form a carbonated drink, such as cola. Beverage dispenser systems often include carbonators for providing carbonated water.

Current carbonators include a tank with an interior portion wherein carbonated water is formed and collected. A carbon dioxide inlet, having one end in communication with a carbon dioxide source and another end in communication with the interior portion of the tank, delivers pressurized carbon dioxide from the carbon dioxide source to the interior portion of the tank. A water inlet, having one end in communication with a plain water source, such as water from a public water line, and another end in communication with the interior portion of the tank, delivers water from the plain water source to the interior portion of the tank. Upon their entry, plain water and carbon dioxide combine under pressure within the interior portion of the tank to form carbonated water. The newly formed carbonated water collects in the tank and exits through an outlet to a beverage dispenser system's dispensing valves.

A beverage flavor syrup line, having one end in communication with a syrup source and another end in communication with the dispensing valves, delivers beverage flavor syrup to the dispensing valves to ultimately form a desired beverage. As such, beverage flavor syrup combines with either plain or carbonated water to form a drink or a carbonated drink, respectively.

Current carbonator design does not provide for the cooling of carbon dioxide prior to entering the tank. In particular, the tank receives carbon dioxide at ambient temperature directly from the carbon dioxide source. Employing carbon dioxide at ambient temperature to form carbonated water greatly diminishes the absorption of carbon dioxide by the water, thereby resulting in carbonated water that is less than favorable and having a greater potential for forming "flat" carbonated drinks. Additionally, in that it is highly desirable in the industry to serve carbonated drinks at the coldest temperature possible, kinetic theory dictates that the high level of molecular activity associated with the pressure head of ambient temperature carbon dioxide unfavorably raises the overall temperature of carbonated water formed within the tank.

Accordingly, there is a long felt need for cooling carbon dioxide prior to its introduction into a carbonator tank to enhance the process for forming carbonated water.

SUMMARY OF THE INVENTION

In accordance with the present invention, a carbon dioxide precooling system, linked with a carbon dioxide source and with a carbonator including a carbonator tank, for aiding in carbonated water formation includes a carbon dioxide line linked with the carbon dioxide source at an inlet and with the carbonator tank at an outlet. Additionally, the carbon dioxide precooling system includes a cooling device in cooperative engagement with the carbon dioxide line. As such, carbon dioxide travels from the carbon dioxide source, across the carbon dioxide line, and to the carbonator tank. The cooling device sufficiently cools the carbon dioxide within the carbon dioxide line prior to entering the carbonator tank thereby aiding in the formation of carbonated water within the carbonator tank.

In a first embodiment of a carbon dioxide precooling system, the cooling device is a cold plate with a cold plate housing. The carbon dioxide line is thus positioned along the cold plate housing to sufficiently cool the carbon dioxide within the carbon dioxide line. In a second embodiment of a carbon dioxide precooling system, the cooling device includes a cooling chamber with cooling fluid disposed therein and a refrigeration unit in cooperative engagement with the cooling chamber for sufficiently cooling the cooling fluid. The carbon dioxide line is thus submerged within the cooling fluid to sufficiently cool the carbon dioxide within the carbon dioxide line.

The carbon dioxide precooling system may further include a beverage dispenser containing dispensing valves for dispensing a desired drink therefrom, such as cola or punch. The carbon dioxide precooling system may provide a water line linked with a water source at one end and with the carbonator tank at another end such that water travels from the water source, across the water line, and to the carbonator tank. The carbon dioxide precooling system may provide a beverage flavor syrup line linked with a syrup source at an inlet and with the dispensing valves at an outlet whereby beverage flavor syrup travels from the syrup source, across the beverage flavor syrup line, and to the dispensing valves. Accordingly, the water line may be positioned in cooperative engagement with the cooling device such that the water within the water line is sufficiently cooled prior to entering the carbonator tank. The beverage flavor syrup line may be positioned in cooperative engagement with the cooling device such that the beverage flavor syrup within the beverage favor syrup line is sufficiently cooled prior to entering the dispensing valves.

Furthermore, the carbon dioxide precooling system may include a carbonated water line linked with the carbonator tank at an inlet and with the dispensing valves at an outlet whereby carbonated water travels from the carbonator tank, across the carbonated water line, and to the dispensing valves. The carbonated water line may be positioned in cooperative engagement with the cooling device such that the carbonated water within carbonated water line is sufficiently cooled prior to entering the dispensing valves.

In accordance with the present invention, a method for aiding in the formation of carbonated water includes linking a carbon dioxide line with a carbon dioxide source to receive a supply of carbon dioxide across the carbon dioxide line. The carbon dioxide line is linked with a carbonator for delivering carbon dioxide to the carbonator. A cooling device is provided in cooperative engagement with the carbon dioxide line to sufficiently cool the carbon dioxide within the carbon dioxide line prior to entering the carbonator, thereby aiding in the formation of carbonated water in the carbonator. Cooling carbon dioxide with a cooling device may comprise utilizing a cold plate whereby the carbon dioxide line is positioned along the cold plate to sufficiently cool the carbon dioxide within the carbon dioxide line. Cooling carbon dioxide with a cooling device may comprise submerging the carbon dioxide line in a cooling fluid to sufficiently cool the carbon dioxide within the carbon dioxide line.

It is therefore an object of the present invention to provide a carbon dioxide precooling system and associated method for enhancing the process for forming carbonated water.

It is a further object of the present invention to provide a carbon dioxide precooling system for a carbonator that cools carbon dioxide prior to its introduction into the carbonator.

Still other objects, features, and advantages of the present invention will become evident to those skilled in the art in light of the following.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. The figures are not necessarily to scale, and some features may be exaggerated to show details of particular components or steps.

Figure 1:
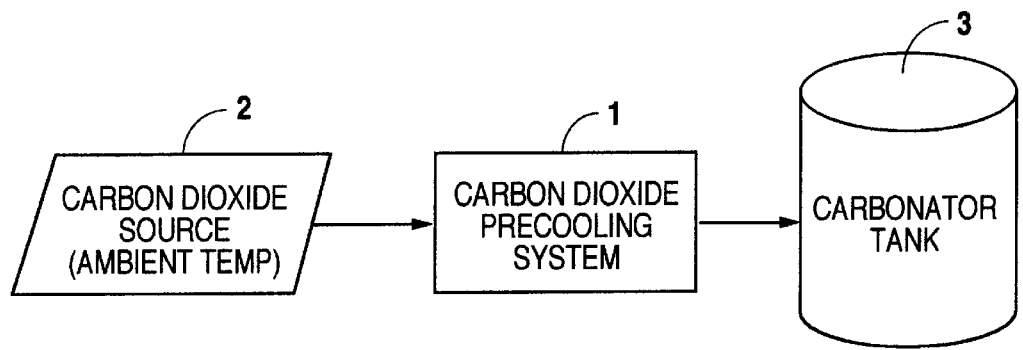
FIG. 1 is a schematic view illustrating a carbon dioxide precooling system as is preferred for cooling carbon dioxide prior to its introduction into a carbonator tank.

As illustrated in FIG. 1, a carbon dioxide precooling system 1 is linked at an inlet with a carbon dioxide source 2 and at an outlet with a carbonator tank 3, whereby carbon dioxide flows from the carbon dioxide source 2 through the carbon dioxide precooling system 1 to the carbonator tank 3. In this preferred embodiment, the carbon dioxide source is a standard, commercially available carbon dioxide tank where carbon dioxide is stored therein at ambient room temperature. The carbonator tank 3 may be configured in any shape necessary to meet the space requirements of a beverage dispensing system and, in this preferred embodiment, is constructed from any suitable material such as metal or hard plastic. Carbonator tank 3 includes a tank wall defining an interior portion wherein carbonated water is formed and collected. As such, on entering the carbonator tank 3, carbon dioxide and water combine under pressure within the interior portion of the carbonator tank 3 to form carbonated water. The newly formed carbonated water collects in carbonator tank 3 and exits carbonator tank 3 to thus form a desired carbonated drink.

Figure 2:
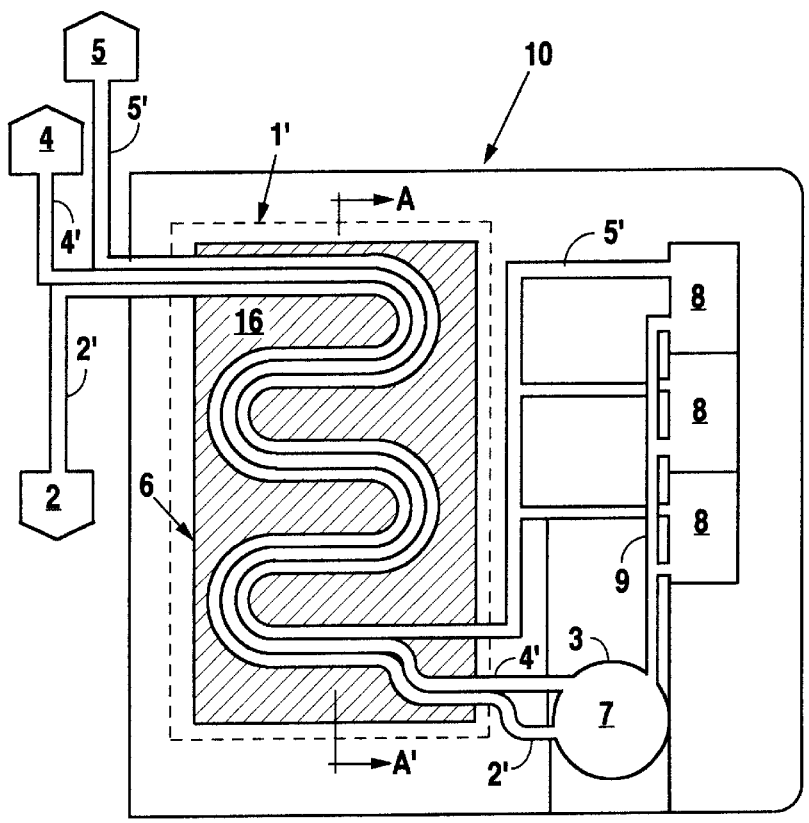
FIG. 2 is a top elevation view illustrating a first embodiment of the present invention featuring a carbon dioxide line incorporated with a cold plate for cooling carbon dioxide prior to introduction into a carbonator tank.

Accordingly, two embodiments of the present invention are contemplated for cooling carbon dioxide prior to its introduction into a carbonator tank although those skilled in the art will recognize other suitable and equivalent embodiments. In the first embodiment, shown in FIGS. 2 and 3, a carbon dioxide precooling system 1', disposed within a beverage dispenser 10, includes a carbon dioxide line 2' linked with a carbon dioxide source 2 at an inlet and with a carbonator 7 at an outlet. Carbon dioxide thus travels from carbon dioxide source 2 across carbon dioxide line 2' to carbonator 7. Additionally, water is delivered from a plain water source 4, such as a public water line, to carbonator 7 via a water line 4' linked with the plain water source 4 at an inlet and with the carbonator 7 at an outlet. As such, water from water line 4' and carbon dioxide from carbon dioxide line 2' are combined under pressure within a carbonator tank 3 of carbonator 7 to form carbonated water.

Furthermore, beverage flavor syrup is delivered from a syrup source 5 to dispensing valves 8 via a beverage flavor syrup line 5' linked with the syrup source 5 at an inlet and with the dispensing valves 8 at an outlet. Therefore, when a carbonated drink is desired, carbonated water is delivered from the carbonator 7 across a carbonated water line 9 to a desired dispensing valve from dispensing valves 8. Beverage flavor syrup brought to dispensing valves 8 by beverage flavor syrup line 5' is thus combined, in dispensing valves 8, with carbonated water from carbonated water line 9 to form the desired carbonated drink. It should be added that, as those skilled in the art will recognize, pumps associated with delivering water across water line 4', beverage flavor syrup across beverage flavor syrup line 5', and carbonated water across carbonated water line 9 are not shown in FIGS. 2–3.

The carbon dioxide precooling system 1' includes a cooling device for cooling carbon dioxide within carbon dioxide line 2'. As preferred, the cooling device comprises a cold plate 6 that is secured to the beverage dispenser 10 using any suitable means. Cold plate 6 includes a cold plate housing 16 with an outer surface and an inner surface. Cold plate housing 16 is made from any suitable material such as aluminum or aluminum alloy. As such, carbon dioxide line 2' is disposed within cold plate housing 16 so as to sufficiently cool the carbon dioxide flowing through the carbon dioxide line 2' as is preferred for the optimum formation of carbonated water. The water line 4' and the beverage flavor syrup line 5' are also disposed within the cold plate housing 16 for cooling the water and beverage flavor syrup flowing therein, respectively.

Figure 3:
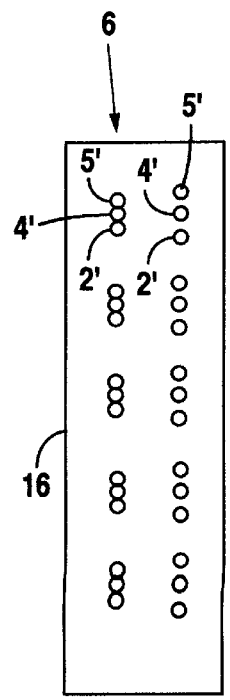
FIG. 3 is a cross-section taken along the lines a, a' of FIG. 2 illustrating the preferred positioning of the carbon dioxide line with respect to the cold plate.

FIG. 3 illustrates the preferred positioning within the cold plate housing 16 of the carbon dioxide line 2' as well as of the water line 4' and the beverage flavor syrup line 5'. It must be emphasized that the distance between the carbon dioxide line 2' and the cold plate housing 16 as well as the distance between the carbon dioxide line 2' and the water and the beverage flavor syrup lines 4', 5', respectively, may be varied to optimally facilitate heat transfer to their respective fluids flowing therein. Moreover, each line disposed within the cold plate housing 16 may be of any size, shape, and spatial configuration, such as a helical or a serpentine configuration, necessary to facilitate optimum heat transfer and, in this preferred embodiment, is constructed from any suitable material, such as metal or hard plastic. Additionally, although FIG. 3 shows the carbon dioxide line 2', the water line 4', and the beverage flavor syrup line 5' arranged in five rows and two columns, those skilled in the art will recognize that any number of rows and columns which will facilitate maximum heat transfer to the respective fluids flowing within such lines may be utilized.

In operation, the carbon dioxide line 2' and the cold plate 6, both of the carbon dioxide precooling system 1', sufficiently cool carbon dioxide delivered from the carbon dioxide source 2 prior to introducing the cooled carbon dioxide within the carbonator tank 3. Specifically, ice is placed along the outer surface of the cold plate 6. In effect, the ice acts as a heat sink that absorbs heat from the carbon dioxide, water, and beverage flavor syrup flowing respectively through the carbon dioxide line 2', the water line 4', and the beverage flavor syrup line 5', each disposed within the cold plate 6.

Heat thus travels from the lines, across the inner surface and the outer surface of the cold plate 6, respectively, to the ice, thereby cooling the fluids flowing through such lines.

Cooled carbon dioxide and cooled water are delivered from the carbon dioxide line 2' and the water line 4' into the carbonator tank 3. The cooled water combines with the cooled carbon dioxide under pressure to form a favorably cooler carbonated water than if carbon dioxide were provided at ambient temperature, which is current industry practice, i.e. in the absence of the carbon dioxide precooling system 1'. When a carbonated drink is thus desired, cooled carbonated water is delivered from carbonator 7 across carbonated water line 9 to a desired dispensing valve of dispensing valves 8. Beverage flavor syrup brought to dispensing valves 8 by beverage flavor syrup line 5' is thus combined, in dispensing valves 8, with carbonated water from carbonated water line 9 to form the desired carbonated drink. To further enhance the drink formation process, it should be added that the favorably cooler carbonated water can be further cooled prior to entering dispensing valves 8 in that carbonated water line 9 may be disposed within cold plate 6.

Figure 4:
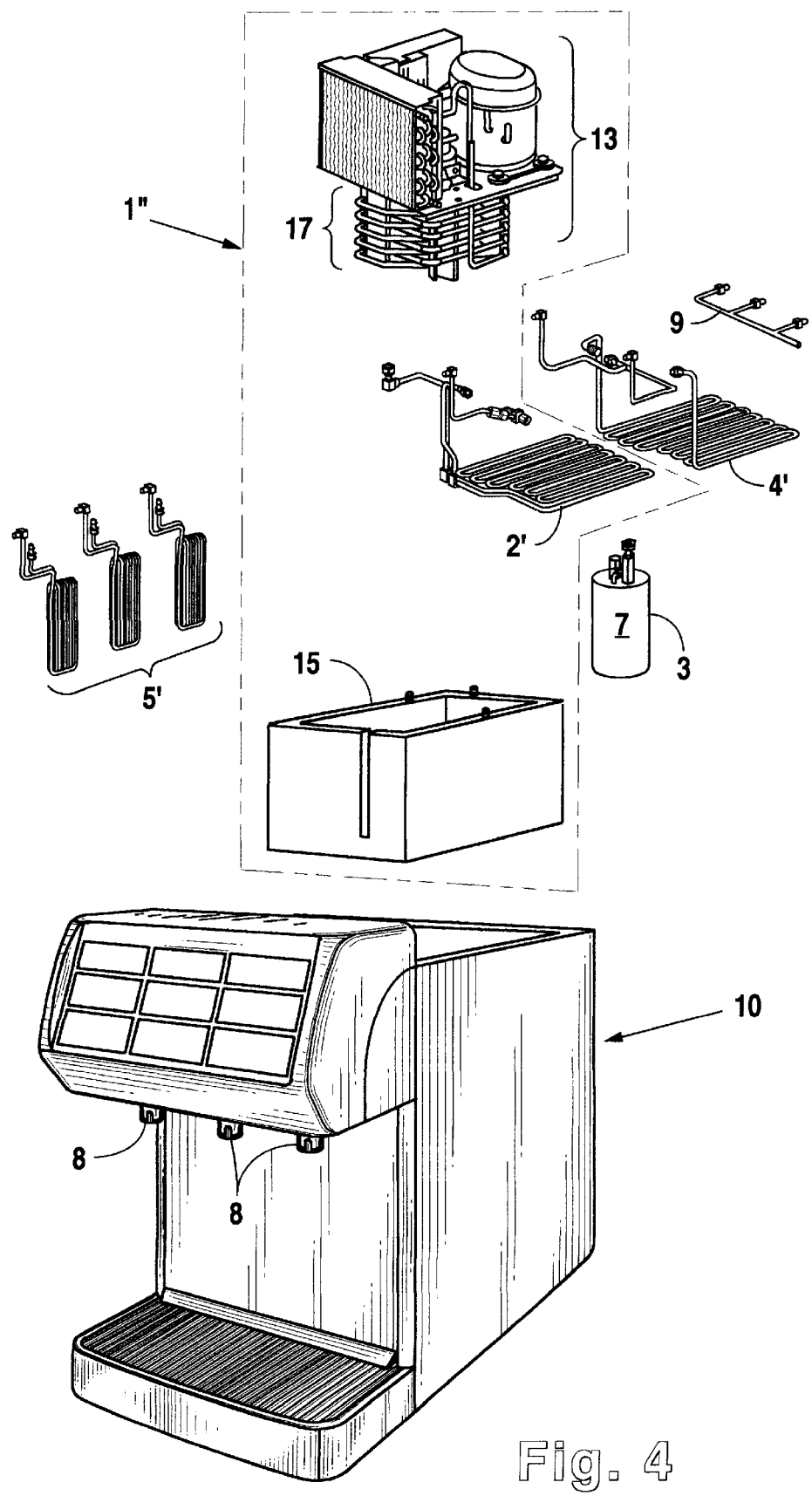
FIG. 4 is a exploded view illustrating a second embodiment of the present invention featuring a carbon dioxide line disposed in a cooling fluid bath for cooling carbon dioxide prior to introduction into a carbonator tank.

In the second embodiment, shown in FIG. 4, a carbon dioxide precooling system 1", disposed within a beverage dispenser 10, includes a carbon dioxide line 2' linked with the carbon dioxide source (not shown) at an inlet and with a carbonator 7 at an outlet. Carbon dioxide thus travels from the carbon dioxide source across the carbon dioxide line 2' to the carbonator 7. Water is delivered from a plain water source (not shown), such as a public water line, to carbonator 7 via a water line 4' linked with the plain water source at an inlet and with the carbonator 7 at in outlet. Water from water line 4' and carbon dioxide from carbon dioxide line 2' are thus combined under pressure within a carbonator tank 3 of carbonator 7 to form carbonated water. In addition, beverage flavor syrup is delivered from a syrup source (not shown) to dispensing valves 8 via a beverage flavor syrup line 5' linked with the syrup source at an inlet and with the dispensing valves 8 at an outlet. Therefore, when a carbonated drink is desired, carbonated water is delivered from the carbonator 7 across a carbonated water line 9 to a desired dispensing valve of dispensing valves 8 in the same manner as described above. It should be added that, as those skilled in the art will recognize, pumps associated with delivering water across water line 4', beverage flavor syrup across beverage flavor syrup line 5', and carbonated water across carbonated water line 9 are not shown in FIG. 4.

The carbon dioxide precooling system 1" includes a cooling device for cooling carbon dioxide within carbon dioxide line 2'. As preferred, the cooling device includes a cooling chamber 15 disposed within beverage dispenser 10. Cooling chamber 15 contains a cooling fluid that is typically water. The cooling device includes a refrigeration unit 13 in cooperative engagement with the cooling chamber 12. Refrigeration unit 13 includes a standard beverage dispenser refrigeration system which contains an evaporator coil 17 that extends from the refrigeration unit 13 into the cooling chamber 15 so that the evaporator coil 17 is submerged within the cooling fluid. As such, the cooling fluid freezes in a slab about the evaporator coil 17.

In this second embodiment, the carbon dioxide line 2' in addition to the water line 4' and the product line 5' are submerged within the cooling fluid to cool the respective fluids flowing within the lines in accordance with forming a desired drink or carbonated drink. As such, the refrigeration unit 13 establishes a circuitous path of convection of unfrozen cooling fluid about the slab of frozen cooling fluid to facilitate optimum heat exchange between the cooler cooling fluid and the warmer carbon dioxide, water, and beverage flavor syrup flowing within the carbon dioxide line 2', the water line 4', and the beverage flavor syrup line 5', respectively.

Moreover, each line disposed within the cooling chamber 15 may be of any size, shape, and spatial configuration, such as a helical or a serpentine configuration, necessary to facilitate optimum heat transfer and, in this preferred embodiment, are constructed from any suitable material, such as metal or hard plastic. Although FIG. 4 shows the carbon dioxide line 2' as a single wound line, the water line 4' as a single wound line, and the beverage flavor syrup line 5' collectively as a set of three single wound lines, those skilled in the art will recognize that any number of wound lines which will facilitate maximum heat transfer to the respective fluids flowing within such lines may be utilized.

In operation, the carbon dioxide line 2' as well as the cooling chamber 15 and the refrigeration unit 13, all of the carbon dioxide precooling system 1", sufficiently cool carbon dioxide delivered from the carbon dioxide source prior to introducing the cooled carbon dioxide into the carbonator tank 3. Specifically, unfrozen cooling fluid within cooling chamber 15 follows a continuous path of convection between the cooler frozen slab of cooling fluid and the warmer carbon dioxide line 2', water line 4', and beverage flavor syrup line 5. In effect, the slab of frozen cooling fluid acts as a heat sink and the unfrozen cooling fluid acts as a medium or "intermediary" for heat exchange, whereby the slab absorbs heat transferred by the unfrozen cooling fluid from the carbon dioxide as well as from the water, and beverage flavor syrup flowing through the respective carbon dioxide line 2', water line 4', and beverage flavor syrup line 5', each submerged in the unfrozen cooling fluid.

As such, cooled carbon dioxide and cooled water are delivered from the carbon dioxide line 2' and the water line 4' into the carbonator tank 3. The cooled water combines with the cooled carbon dioxide under pressure to form a favorably cooler carbonated water than if carbon dioxide were provided at ambient temperature, i.e. in the absence of the carbon dioxide precooling system 1". When a carbonated drink is thus desired, cooled carbonated water is delivered from carbonator 7 across carbonated water line 9 to a desired dispensing valve of dispensing valves 8. Beverage flavor syrup brought to dispensing valves 8 by beverage flavor syrup line 5' is thus combined in dispensing valves 8 with carbonated water from carbonated water line 9 to form the desired carbonated drink. To further enhance the drink formation process, it should be added that the favorably cooler carbonated water can be further cooled prior to entering dispensing valves 8 in that carbonated water line 9 may be submerged with the cooling fluid of cooling chamber 15.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. A carbon dioxide precooling system, comprising:
   a beverage dispenser for dispensing a desired drink therefrom, the beverage dispenser including the carbon dioxide precooling system disposed therein;

a carbon dioxide line linked with a carbon dioxide source at an inlet and with a carbonator at an outlet, whereby carbon dioxide travels from the carbon dioxide source, across the carbon dioxide line, and to the carbonator;

a water line linked with a water source at one end and with the carbonator at another end, whereby water travels from the water source, across the water line, and to the carbonator; and a cooling device, in cooperative engagement with the carbon dioxide line, for substantially cooling the carbon dioxide within the carbon dioxide line prior to entering the carbonator, thereby aiding in carbonated water formation in the carbonator.

2. The carbon dioxide precooling system according to claim 1, wherein the water line is in cooperative engagement with the cooling device whereby water within the water line is substantially cooled by the cooling device prior to entering the carbonator.

3. The carbon dioxide precooling system according to claim 1, further comprising:

dispensing valves disposed on the beverage dispenser for dispensing a desired drink therefrom;

a syrup source coupled with the beverage dispenser for delivering a supply of beverage flavor syrup to the beverage dispenser; and a beverage flavor syrup line linked with the syrup source at an inlet and with the dispensing valves at an outlet, whereby beverage flavor syrup travels from the syrup source, across the beverage flavor syrup line, and to the dispensing valves.

4. The carbon dioxide precooling system according to claim 3, wherein the beverage flavor syrup line is in cooperative engagement with the cooling device whereby beverage flavor syrup within the beverage flavor syrup line is substantially cooled by the cooling device prior to entering the dispensing valves.

5. The carbon dioxide precooling system according to claim 1, further comprising:

dispensing valves disposed on the beverage dispenser for dispensing a desired drink therefrom; and a carbonated water line linked with the carbonator tank at an inlet and with the dispensing valves at an outlet.

6. The carbon dioxide precooling system according to claim 5, wherein the carbonated water line is in cooperative engagement with the cooling device whereby carbonated water within the carbonated water line is substantially cooled by the cooling device prior to entering the dispensing valves.

7. The carbon dioxide precooling system according to claim 1, wherein the cooling device comprises a cold plate.

8. The carbon dioxide precooling system according to claim 7, wherein the carbon dioxide line is positioned along the cold plate, thereby substantially cooling the carbon dioxide within the carbon dioxide line.

9. The carbon dioxide precooling system according to claim 1, wherein the cooling device comprises:

a cooling chamber including cooling fluid disposed therein; and a refrigeration unit in cooperative engagement with the cooling chamber for substantially cooling the cooling fluid.

10. The carbon dioxide precooling system according to claim 9, wherein the carbon dioxide line is submerged in the cooling fluid, thereby substantially cooling the carbon dioxide within the carbon dioxide line.

11. A method for aiding in carbonated water formation via a carbon dioxide precooling system, comprising the steps of:

linking a carbon dioxide line with a carbon dioxide source to receive a supply of carbon dioxide across the carbon dioxide line;

linking the carbon dioxide line with a carbonator for delivering carbon dioxide from the carbon dioxide line to the carbonator;

linking a cooling device in cooperative engagement with the carbon dioxide line;

substantially cooling the carbon dioxide within the carbon dioxide line prior to entering the carbonator utilizing the cooling device, thereby aiding in carbonated water formation in the carbonator combining carbon dioxide with water in the carbonator to form carbonated water; and delivering carbonated water via a carbonated water line from the carbonator tank to dispensing valves of a beverage dispenser.

12. The method according to claim 11, wherein the step of linking a cooling device in cooperative engagement with the carbon dioxide line comprises positioning the carbon dioxide line along a cold plate thereby substantially cooling the carbon dioxide within the carbon dioxide line.

13. The method according to claim 11, wherein the step of linking a cooling device in cooperative engagement with the carbon dioxide line comprises submerging the carbon dioxide line in cooling fluid thereby substantially cooling the carbon dioxide within the carbon dioxide line.

14. The method according to claim 11, further comprising the step of:

substantially cooling the carbonated water within the carbonated water line prior to entering the dispensing valves utilizing the cooling device.

* * * * *